UNITED STATES PATENT OFFICE.

KURT DESAMARI, OF COLOGNE, GERMANY, ASSIGNOR TO SYNTHETIC PATENTS CO., INC., OF NEW YORK, N. Y., A CORPORATION OF NEW YORK.

AZO DYESTUFF.

1,126,413. Specification of Letters Patent. Patented Jan. 26, 1915.

No Drawing. Application filed April 1, 1914. Serial No. 828,779.

*To all whom it may concern:*

Be it known that I, KURT DESAMARI, doctor of technical arts, chemist, citizen of the German Empire, residing at Cologne-on-the-Rhine, Germany, have invented new and useful Improvements in Azo Dyestuffs, of which the following is a specification.

I have found that new and valuable azo dyestuffs having in a free state most probably the following formula:

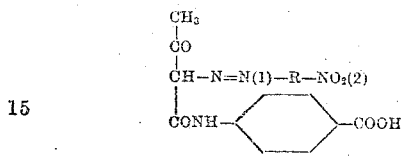

(R meaning an aryl *e. g.*

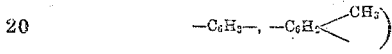

can be obtained by combining a diazo compound of an ortho-nitranilin, *e. g.* ortho-nitranilin, nitro-toluidin ($CH_3 : NO_2 : NH_2 =$ 1:3:4), chloro-nitranilin ($Cl : NO_2 : NH_2 =$ 4:2:1) with aceto-acetic-anilid-para-carboxylic acid.

The new dyes are in the shape of their alkaline salts yellowish powders soluble in water and in concentrated sulfuric acid generally with a yellowish coloration; they are particularly suitable for the production of color lakes which are distinguished by their pure greenish-yellow shades and excellent fastness to oil and to water. Upon treatment with stannous chlorid and hydrochloric acid they are reduced, an ortho-diamin of the benzene series being obtained.

The aceto-acetic-anilid-para-carboxylic acid

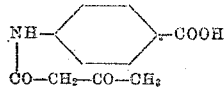

can be obtained by heating a para-amino-benzoic-acid-ester with aceto-acetic-ester with or without the addition of indifferent diluents and by saponifying the resulting esters with caustic alkalis.

The following example may serve as an illustration for the production of the new aceto-acetic-anilid-para-carboxylic esters and of the new aceto-acetic-anilid-para-carboxylic-acid, the parts being by weight:—

Example 1: 165 parts of para-amino-benzoic-ethyl-ester are dissolved in 575 parts of solvent naphtha and 150 parts of aceto-acetic-ether are allowed to run gradually into the boiling solution, the vessel containing it being connected with a downward directed condenser. When the reaction is complete the new ester crystallizes from the concentrated solution with an almost quantitative yield. It is soluble in the usual organic solvents and melts at 125° C. 249 parts of the ester thus obtained are well mixed with 100 parts of alcohol and a hot solution of 125 parts of caustic soda in 400 parts of water is gradually added to the alcoholic paste in such manner that the temperature of the mixture is about 50° C. After stirring for half an hour at this temperature the ester is completely dissolved and the new aceto-acetic-anilid-para-carboxylic acid is precipitated from the solution by addition of HCl. It melts with decomposition at 185° C.

In order to illustrate the process for the production of the new azo dyes the following example is given, the parts being by weight:—

Example 2: 152 parts of 3-nitro-4-toluidin:

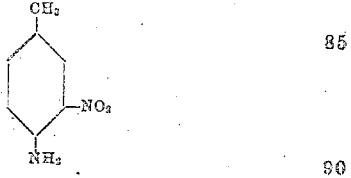

are dissolved by heating in 200 parts of concentrated sulfuric acid. The solution is poured on ice; the finely divided precipitate which separates is filtered off, made into a paste with 300 parts of crude hydrochloric acid and diazotized at 5° C. with 69 parts of sodium nitrit. The mineral acid of the diazo solution is almost completely neutralized at the same temperature with sodium bicarbonate and the diazo compound is then allowed to run into a neutral solution of 221 parts of aceto-acetic-acid-anilid-para-carboxylic acid to which 150 parts of sodium bicarbonate has been added.

The sodium salt of the new color is a yellowish powder having in a free state most probably the formula:

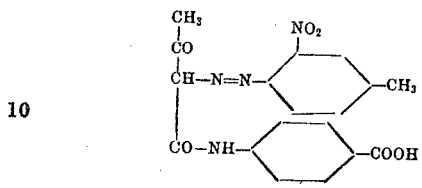

soluble in water with a yellowish coloration. It can be converted, by the usual methods suitable for the preparation of lakes, into the color lakes, for instance into the barium or calcium lake. Upon treatment with stannous chlorid and hydrochloric acid diaminomethylbenzene is obtained.

I claim:—

1. The new dyestuffs derivable from a diazotized ortho-nitranilin and aceto-acetic-acid-anilid-para-carboxylic-acid having in a free state most probably the formula:

$$CH_3-CO-CH-N=N(1)-R-NO_2(2)$$
$$|$$
$$CONH-\langle\rangle-COOH$$

(R meaning aryl) which are in the shape of their alkaline salts yellowish powders soluble in water and in concentrated sulfuric acid generally with a yellowish coloration; yielding upon reduction with stannous chlorid and hydrochloric acid an ortho-diamin; and yielding greenish-yellow color lakes, substantially as described.

2. The new dyestuff derivable from diazotized 3-nitro-4-toluidin and aceto-acetic-acid-anilid-para-carboxylic acid having in a free state most probably the formula:

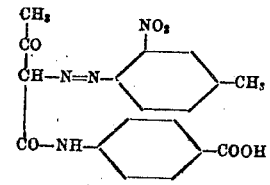

which is in the shape of its alkaline salt a yellowish powder soluble in water with a yellowish coloration; yielding upon reduction with stannous chlorid and hydrochloric acid diaminomethylbenzene; and yielding greenish-yellow color lakes, substantially as described.

In testimony whereof I have hereunto set my hand in the presence of two subscribing witnesses.

KURT DESAMARI.

Witnesses:
　LOUIS VANDORY,
　HANS BRÜCKNER.